United States Patent Office 3,418,394
Patented Dec. 24, 1968

3,418,394
PROCESS FOR MAKING BLOCK COPOLYMERS OF CONJUGATED DIENES AND VINYL-SUBSTITUTED AROMATICS
Clinton F. Wofford, Bartlesville, Okla., assignor to Phillips Petroleum Company, a corporation of Delaware
No Drawing. Filed Jan. 7, 1966, Ser. No. 519,304
7 Claims. (Cl. 260—880)

ABSTRACT OF THE DISCLOSURE

Block copolymers of improved green tensile strength are prepared by conducting the polymerization with an organomonolithium initiator in the presence of tetramethylurea. The block copolymers are derived from conjugated dienes and vinyl-substituted aromatic compounds.

---

This invention relates to the preparation of copolymers. In one aspect, this invention relates to a method for preparing block copolymers of conjugated dienes and vinyl-substituted aromatic compounds.

Various methods are known in the prior art for the production of polymeric materials that are made up of different segments or blocks. Block copolymers of vinyl-substituted aromatic compounds and conjugated dienes have been prepared with various initiators such as organo alkali metal type initiators. It is known that block copolymers of vinyl-substituted aromatic compounds and conjugated dienes can be prepared by use of organo-monolithium initiators. Such processes can be carried out by adding one of the monomers to the polymerization system with the organomonolithium initiator and allowing the monomer to polymerize to substantial completion. Thereafter, the other monomeric material can be added to the polymerization system and it is allowed to polymerize, thereby producing a block copolymer having two distinct polymer blocks. It has also been suggested that block copolymers can be formed with organomonolithium initiators by simply adding a mixture of the conjugated diene monomers and the vinyl-substituted aromatic monomers. In such a process, the conjugated diene monomers polymerize first to produce a polymer block that is predominantly a conjugated diene block, with very small amounts of the vinyl-substituted aromatic compound incorporated therein. After substantially all of the conjugated diene monomer in the mixture has polymerized, the vinyl-substituted aromatic compound is polymerized to produce a second polymer block that is predominantly a vinyl-substituted aromatic polymer block. It is obvious that this latter process is simple and can be conveniently carried out in commercial operations. However, it has been found that block copolymers produced by either of the above processes, using organomonolithium initiators, have very low tensile strengths when in the uncured state commonly referred to as "green tensile strength."

It is an object of my invention to provide a method for preparing block copolymers. Another object of my invention is to provide a process for preparing block copolymers of conjugated dienes and vinyl-substituted compounds in the presence of organomonolithium initiators. It is a further object of my invention to provide a process for preparing block copolymers of vinyl-substituted aromatic compounds and conjugated dienes having improved green tensile strengths.

Other aspects, objects and advantages of my invention will be apparent to those skilled in the art upon consideration of the following disclosure.

I have discovered a process for producing rubbery block copolymers of conjugated dienes and vinyl-substituted aromatic compounds in the presence of organo-monolithium initiators that have high green tensile strengths. Broadly speaking, my invention comprises carrying out the copolymerization process of conjugated dienes and the vinyl-substituted aromatic compounds with an organomonolithium initiator in the presence of tetramethylurea. The block copolymers produced with the organomonolithium initiator in the presence of tetramethylurea have increased green tensile strength when compared to polymers that have been produced in the absence of tetramethylurea. In many instances, the green tensile strength of the polymer products produced in accordance with my invention is at least several hundred per cent greater than the green tensile strengths of the polymers made by prior art methods.

The conjugated dienes that can be utilized in making the block copolymers in accordance with the process of my invention are the conjugated dienes containing from 4 to 12 carbon atoms per molecule. Preferably, the conjugated dienes used in accordance with my invention will contain from 4 to 8 carbon atoms. Examples of suitable conjugated dienes are 1,3-butadiene, isoprene, piperylene, 2-methylpentadiene, 3,4-dimethyl-1,3-hexadiene, 4,5-diethyl-1,3-octadiene, and the like.

The vinyl-substituted aromatic compounds that can be used in the process of my invention contain from 8 to 20 carbon atoms per molecule. Examples of suitable vinyl-substituted aromatic compounds are styrene, 1-vinylnaphthalene, 2-vinylnaphthalene, 3-methylstyrene, and the like.

The organomonolithium initiators that are used in the process of my invention are those compounds which can be represented by the formula RLi, wherein R is a hydrocarbon radical that can be aliphatic, cycloaliphatic or aromatic containing from 1 to 20 carbon atoms. Examples of the organomonolithium initiators that can be used in the process of my invention include methyllithium, n-butyllithium, tert-butyllithium, cyclohexyllithium, eicosyllithium, and the like.

I have found that it is desirable to conduct the polymerization in the presence of a diluent. Suitable diluents are hydrocarbon diluents selected from the group consisting of paraffins, cycloparaffins and aromatic hydrocarbons. Examples of such diluents are propane, isobutane, n-pentane, isooctane, n-dodecane, cyclopentane, cyclohexane, benzene, toluene, xylene, and the like. Mixtures of the foregoing diluents can also be employed.

The polymerization is carried out at a temperature in the range of about 30 to 150° C. In some instances, it may be desirable to carry out the polymerization reaction outside of the above range. However, the preferred temperature range for carrying out the polymerization is from about 40 to 120° C. The polymerization process is carried out at a pressure sufficient to maintain at least a portion of the monomeric materials in the liquid phase.

The organomololithium initiator and the tetramethylurea can be separately charged to the polymerization system in any order. It is also within the scope of this invention to combine the organomolithium initiator and the tetramethylurea prior to introduction into the polymerization system. The amount of organomolithium initiator that is used for the production of rubbery block copolymers is usually in the range of about 0.3 to 10 gram millimoles per 100 grams of the monomers to be polymerized. The preferred amount of organomonolithium initiator is from about 0.3 to 5 gram millimoles per 100 grams of monomers to be polymerized. The relative amounts of the organomonolithium initiator and the tetramethylurea can vary over a wide range. The mol ratio of the organomonolithium initiator to tetramethylurea is generally in the range of about 1.3:1 to 10:1. However, the mol ratio of organomonolithium initiator to tetramethylurea can be higher in some instances.

The process of my invention can be used in polymerization systems wherein a mixture of the conjugated diene monomer and the vinyl-substituted aromatic monomer is charged to the polymerization zone initially and the polymerization reaction is allowed to proceed. The initial polymer block formed is predominantly a conjugated diene polymer block with small amounts of the vinyl-substituted aromatic compound incorporated therein. After substantially all of the conjugated diene has polymerized, the vinyl-substituted aromatic polymer block is formed.

My process can also be utilized in polymerization systems wherein only one of the monomeric materials is charged to the polymerization system initially. In such instances, the initial polymer block formed is a homopolymer block. This initial polymer block can be a homopolymer of either the conjugated diene or the vinyl-substituted aromatic compound. After the initial polymerization has been carried out for a desired length of time, any unreacted monomer can be removed from the polymerization system and the second monomer can be charged and allowed to polymerize. The resulting block copolymer contains two distinct polymer blocks that are essentially homopolymer blocks. In some instances, it may be desirable to add one of the monomeric materials to the polymerization system initialy and to allow it to partially polymerize. Thereafter, the second monomeric material can be added along with a polar compound that functions to produce a random copolymer in the second polymerization step. The use of polar compounds as randomizing agents is known in the art. Suitable polar compounds for use as randomizing agents include ethers, thioethers and tertiary amines.

At the completion of the polymerization reaction, the polymerization reaction mixture is treated to inactivate the initiator and to recover the polymer product. Suitable methods for initiator inactivation and polymer recovery are well known in the art and shall not be discussed at length here. I have found that one particularly convenient method for inactivating the initiator and recovering the polymer is by the use of alcohol. During the inactivation and recovery procedure, it may be desirable to add various materials such as antioxidants and the like.

The green tensile strengths of the polymers prepared by the above-described procedure are much greater than the green tensile strengths of polymers prepared with organomonolithium initiators in the absence of the tetramethylurea.

It will be obvious to those skilled in the art that various modifications and changes may be made in the above procedure without departing from the scope and spirit of my invention.

The following examples are included to illustrate preferred embodiments of my invention. The examples are not to be interpreted to unduly limit the scope of my invention.

EXAMPLE I

A series of runs was made in order to determine the effect of tetramethylurea in an organomonolithium polymerization system for the production of butadiene/styrene block copolymers. The following recipe and conditions were followed:

| | |
|---|---|
| 1,3-butadiene, parts by weight | 75 |
| Styrene, parts by weight | 25 |
| Cyclohexane, parts by weight | 780 |
| n-Butyllithium, mhm | Variable |
| Tetramethylurea, mhm | 1.0 |
| Temperature, ° F. | 158 |
| Time, hours | 3 | mhm=gram millimoles per 100 grams monomers

Cyclohexane was charged first after which the reactor was purged with nitrogen. Butadiene and styrene were added, then the tetramethylurea, and finally the butyllithium. At the conclusion of the polymerization, each reaction was terminated with a solution of 2,2'-methylene-bis (4-methyl-6-tertbutylphenol) in a mixture of equal parts by volume of toluene and isopropyl alcohol, the amount used being sufficient to provide approximately one part by weight of the antioxidant per 100 parts by weight of polymer. The product was coagulated in isopropyl alcohol, separated, and dried. Conversion was quantitative in all runs. Polystyrene was determined by the oxidative degradation procedure shown in U.S. 3,030,346, column 4. Inherent viscosity was determined by the procedure shown in U.S. 3,078,254. Data are presented in the following table:

| Run No. | BuLi, mhm. | Polystyrene, wt. percent | Inherent viscosity | Green tensile, p.s.i. |
|---|---|---|---|---|
| 1 | 2.1 | 19.5 | 2.39 | 510 |
| 2 | 2.3 | 20.3 | 1.99 | 515 |
| 3 | 2.9 | 18.9 | 1.19 | 270 |
| 4 | 3.1 | 18.3 | 1.05 | 165 |

The products were all rubbery block copolymers. Similar block copolymers prepared with n-butyllithium as the catalyst and no tetramethylurea exhibit green tensile strengths below 10 p.s.i.

EXAMPLE II

A block copolymer was produced using a 50/50 weight mixture of butadiene and styrene. The polymerization was conducted in the presence of tetramethylurea using butyllithium as the catalyst. The following recipe and conditions were followed:

| | |
|---|---|
| 1,3-butadiene, parts by weight | 50 |
| Styrene, parts by weight | 50 |
| Toluene, parts by weight | 860 |
| n-Butyllithium, mhm | 3.0 |
| Tetramethylurea, mhm | 1.0 |
| Temperature, ° F. | 158 |
| Time, hours | 3 |
| Conversion, percent | 100 |

The procedure was essentially that described in Example I. The product had an inherent viscosity of 1.17 and contained 35.4 weight percent polystyrene (determined by the procedure shown in Example I). A sample was pressed into a transparent slab from which 2-inch tensile strips were dried. Tensile strength and elongation were determined at a drawing rate of 20 inches per minute. Values were as follows:

| | |
|---|---|
| Tensile strength, p.s.i. | 710 |
| Elongation, percent | 440 |

The data show that the product had a high green tensile strength. Elongation was also relatively high.

I claim:

1. In a polymerization process for making block copolymers from conjugated diene monomers containing from 4 to 12 carbon atoms per molecule and vinyl-substituted aromatic compounds containing from 8 to 20 carbon atoms per molecule with an organomonolithium initiator, the improvement which comprises carrying out said polymerization process in a polymerization mixture to which tetramethylurea has been added.

2. The process of claim 1 wherein said process is carried out in the presence of a diluent selected from the group consisting of paraffins, cycloparaffins and aromatic hydrocarbons.

3. The process of claim 2 wherein said polymerization process is carried out at a temperature in the range of from about 30 to 150° C. and at a pressure to maintain at least a portion of the monomers in the liquid phase.

4. The process of claim 3 wherein said organomonolithium initiator is present in an amount of from about 0.3 to 10 gram millimoles per 100 grams of said conjugated diene and said vinyl-substituted aromatic compound in the polymerization system.

5. The process of claim 4 wherein the mole ratio of said organomonolithium initiator to said tetramethylurea is in the range of from about 1.3:1 to 10:1.

6. The process of claim 5 wherein said conjugated diene is 1,3-butadiene and said vinyl-substituted aromatic compound is styrene.

7. The process of claim 6 wherein said organomonolithium initiator is n-butyllithium.

References Cited

UNITED STATES PATENTS

| | | | |
|---|---|---|---|
| 3,205,208 | 9/1965 | Coover et al. | 260—93.7 |
| 3,251,905 | 5/1966 | Zelinski | 260—880 |
| 3,265,765 | 8/1966 | Holden et al. | 260—880 |
| 3,322,856 | 5/1967 | Holden et al. | 260—880 |

GEORGE F. LESMES, *Primary Examiner.*

U.S. Cl. X.R.

260—879, 84.7, 94.6